US012585557B2

(12) United States Patent
Jacobson et al.

(10) Patent No.: US 12,585,557 B2
(45) Date of Patent: Mar. 24, 2026

(54) SYNCHRONIZATION OF CONTAINER ENVIRONMENTS TO MAINTAIN AVAILABILITY FOR A PREDETERMINED ZONE

(71) Applicant: Bank of America Corporation, Charlotte, NC (US)

(72) Inventors: Brian Jacobson, Los Angeles, CA (US); Donna Phillips, Newark, DE (US); Elvis Nyamwange, Addison, TX (US); Madhukiran Bangalore Ramachandra, San Ramon, CA (US); Vismay Mandloi, Pennington, NJ (US)

(73) Assignee: Bank of America Corporation, Charlotte, NC (US)

( * ) Notice: Subject to any disclaimer, the term of this patent is extended or adjusted under 35 U.S.C. 154(b) by 86 days.

(21) Appl. No.: 17/957,144

(22) Filed: Sep. 30, 2022

(65) Prior Publication Data

US 2024/0111644 A1     Apr. 4, 2024

(51) Int. Cl.
| | |
|---|---|
| *G06F 11/00* | (2006.01) |
| *G06F 11/20* | (2006.01) |
| *G06F 11/30* | (2006.01) |
| *G06F 11/34* | (2006.01) |

(52) U.S. Cl.
CPC ...... *G06F 11/2025* (2013.01); *G06F 11/3006* (2013.01); *G06F 11/3476* (2013.01)

(58) Field of Classification Search
CPC .............. G06F 11/2025; G06F 11/3006; G06F 11/3476
See application file for complete search history.

(56) References Cited

U.S. PATENT DOCUMENTS

| | | | |
|---|---|---|---|
| 10,191,778 B1 * | 1/2019 | Yang ..................... | G06F 11/301 |
| 11,055,273 B1 * | 7/2021 | Meduri .............. | G06F 16/2358 |
| 11,269,729 B1 * | 3/2022 | Bulusu ............... | G06F 11/0778 |
| 11,520,669 B2 * | 12/2022 | Perneti ............... | G06F 11/1448 |
| 11,561,868 B1 * | 1/2023 | Poornachandran ... | G06F 11/165 |
| 11,734,038 B1 * | 8/2023 | Tsai ...................... | G06F 11/203 |
| | | | 714/19 |
| 11,757,983 B1 * | 9/2023 | Pandey .............. | H04L 67/1001 |
| | | | 709/226 |

(Continued)

OTHER PUBLICATIONS

"Elasticsearch," https://en.wikipedia.org/wiki/Elasticsearch, Wikimedia Foundation, Inc., Aug. 16, 2022.

(Continued)

*Primary Examiner* — Loan L. T. Truong
(74) *Attorney, Agent, or Firm* — Weiss & Arons LLP

(57) ABSTRACT

Apparatus and methods for a proactive monitoring-container switching system is provided. The system may include a server cluster. The system may proactively monitor the servers within the cluster to determine if one or more servers within the cluster are showing weaknesses. Upon identifying the weaknesses, the system may identify an available server within the cluster and copy the contents of the weakened server to the available server. The system may then switch the DNS pointer from the weakened server to the available server. Switching the DNS pointer may switch any users and/or applications from the weakened server to the available server with minimal disruption. The synchronizing between servers may maintain the health of the server cluster.

17 Claims, 6 Drawing Sheets

HIGH LEVEL DESIGN

(56) References Cited

U.S. PATENT DOCUMENTS

| | | | | |
|---|---|---|---|---|
| 11,792,284 | B1 * | 10/2023 | Nanduri | G06F 9/542 |
| | | | | 709/224 |
| 12,034,740 | B1 * | 7/2024 | Carmack | H04L 63/1416 |
| 2017/0344618 | A1 * | 11/2017 | Horowitz | G06F 16/27 |
| 2019/0087277 | A1 * | 3/2019 | Kore | H04L 67/06 |
| 2019/0296962 | A1 * | 9/2019 | Lisle | G06F 11/1464 |
| 2021/0011816 | A1 * | 1/2021 | Mitkar | G06F 11/301 |
| 2021/0089361 | A1 * | 3/2021 | Rafey | G06F 9/45558 |
| 2021/0182114 | A1 * | 6/2021 | Vyas | G06F 11/3003 |
| 2022/0100564 | A1 * | 3/2022 | Venkitachalam | G06F 11/3409 |
| 2022/0229741 | A1 * | 7/2022 | Bhushan | G06F 16/284 |
| 2022/0292303 | A1 * | 9/2022 | Cao | G06N 20/00 |
| 2022/0334870 | A1 * | 10/2022 | Chen | G06F 9/4856 |
| 2023/0021195 | A1 * | 1/2023 | Yang | G06F 11/2094 |
| 2023/0214306 | A1 * | 7/2023 | Ye | G06F 11/3409 |
| | | | | 707/609 |
| 2023/0327949 | A1 * | 10/2023 | Singh | H04L 67/34 |
| | | | | 709/221 |
| 2024/0028488 | A1 * | 1/2024 | Balcha | G06F 11/1461 |
| 2024/0086253 | A1 * | 3/2024 | Venkata | G06F 40/30 |

OTHER PUBLICATIONS

Hubert Yoshida, "Leveraging Cloud Services with HCP S3 Tiering," https://community.hitachivantara.com/blogs/hubert-yoshida/2018/ 09/12/leveraging-cloud-services-with-hop-s3-tiering, Sep. 12, 2018.

* cited by examiner

HIGH LEVEL DESIGN

HIGH LEVEL DESIGN

HIGH LEVEL DESIGN

HIGH LEVEL DESIGN

SYNCHRONIZATION OF CONTAINER ENVIRONMENTS TO MAINTAIN AVAILABILITY FOR A PREDETERMINED ZONE

FIELD OF TECHNOLOGY

Aspects of the disclosure relate to remediation of server failures.

BACKGROUND OF THE DISCLOSURE

Enterprises may utilize server clusters. Server clusters may include one or more computing devices, such as mainframes, servers, computers, containers, processors, memory and any other suitable computing components. These server clusters may be specialized for a specific executable, such as a software application.

At times, a server cluster may incur a failure. In response to the server cluster failure, the executable executing on the server cluster needed to be manually moved to a different server cluster in order to execute. This process of moving the executable from the failed server cluster to a new server cluster is highly resource consumptive. Furthermore, the downtime associated with the software application is high.

The downtime may be high because a developer is only notified once the failure has occurred, and it may take a number of hours before the new server cluster is built and the software application is executing correctly.

Additionally, a failure may occur during a time when the developer is unavailable. As such, the executable may stop executing until a developer is able to manually move the executable from the failed server cluster to an operating server cluster.

Because of the difficulties associated with the manual failover process, it would be desirable to create an automated proactive monitoring failover process.

It would be desirable for the automated proactive monitoring failover process to detect server clusters that are reaching a threshold that indicates impending failure.

It would be further desirable for the automated proactive monitoring failover process to automatically create a new server cluster for the server clusters that are reaching a threshold that indicates impending failure.

It would be yet further desirable for the automated proactive monitoring failover process to customize the new server cluster to mimic to server cluster that is reaching the threshold that indicates impending failure.

It would be still further desirable for the automated proactive monitoring failover process to transfer the executables executing at the server cluster that is reaching the threshold that indicates impending failure once the new server cluster is operative.

SUMMARY OF THE DISCLOSURE

An automated proactive monitoring failover apparatus, system, process and method is provided. The automated proactive monitoring failover process may minimize downtime, user disruption and increase runtime of executables.

The proactive monitoring container switching system may include a first server, a second server and a proactive monitoring subsystem.

The first server may operate with a first hardware processor and a first hardware memory. The first server may execute one or more first software containers. The first hardware memory may include the one or more first software containers.

The first server and/or the first software containers may be operated on by one or more remote users. The first server and/or the first software containers may interface with one or more vendor systems. The one or more remote users and/or one or more vendor systems may access the first server using a first address identified by a domain name service (DNS) pointer.

The second server may operate with a second hardware processor and a second hardware memory. The second server may execute one or more second software containers.

The proactive monitoring subsystem may scan the first server for a plurality of efficiency metrics. The proactive monitoring subsystem may identify that the first server is exceeding one or more efficiency metrics included in the plurality of efficiency metrics.

The efficiency metrics may include central processing unit usage, memory usage or any other suitable metrics. The efficiency metrics may be customizable by the remote users and/or the vendor systems.

The proactive monitoring subsystem may copy the entirety of the first hardware memory to the second hardware memory. The copying may be simultaneous to, and therefore may not disrupt the one or more remote users and/or the one or more vendor systems operating on the first server and the one or more first software containers.

The proactive monitoring subsystem may test an operation of the second server to determine a health metric of the second server. The testing may ensure that the second server is capable prior to switching operations from the first server to the second server.

Upon identifying that the health metric of the second server is above a predetermined threshold, the proactive monitoring subsystem may execute an application programming interface (API) that changes the DNS pointer from a first address that identifies a location of the first server to a second address that identifies a location of the second server. The proactive monitoring subsystem may enable the one or more remote users and the one or more vendor systems to operate on the second server and the one or more second software containers.

It should be noted that the first address and the second address may be IP addresses. A DNS may include a listing of uniform resource locators (URLs) or hostnames and associated IP addresses. A URL may be assigned a specific IP address. A DNS pointer may be the link between the URL and the IP address. When switching the DNS pointer from the first address to the second address, the URL and hostname may remain the same, however, the underlying access point, such as the server, may be changed.

In some embodiments, there may be one set of software containers. In such embodiments, the proactive monitoring subsystem may move the software containers from the first server to the second server.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
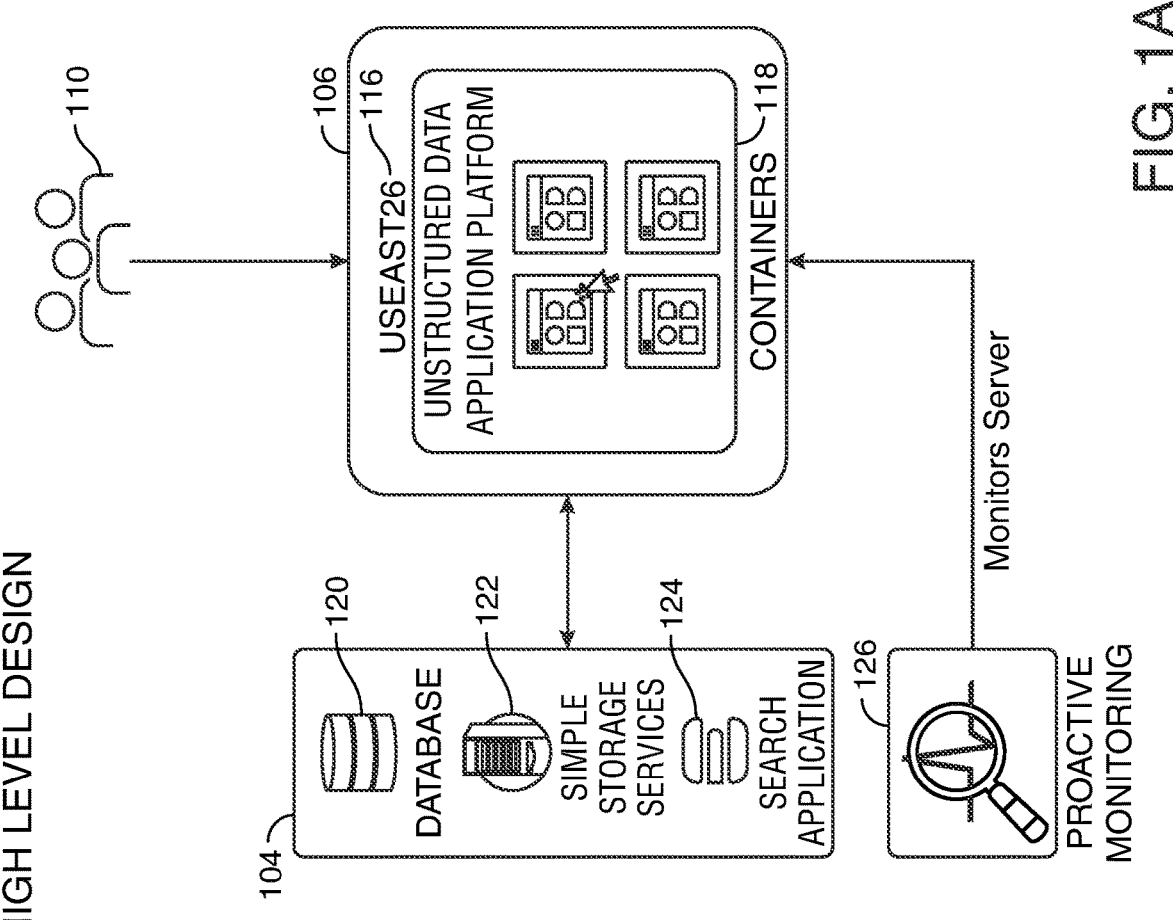
FIGS. 1A, 1B, 1C and 1D show illustrative diagrams in accordance with principles of the disclosure.

Apparatus and methods for proactively monitoring a server cluster may be provided. The method may include monitoring health of a server cluster. The server cluster may include a plurality of servers. The monitoring may include identifying a central processing unit ("CPU") utilization metric for each server included in the plurality of servers.

The monitoring may include identifying a memory utilization metric for each server included in the plurality of servers. The monitoring may include identifying a number of recurrent errors and recurring restarts in an error log included in each server included in the plurality of servers.

The method may include identifying that a first server, included in the server cluster, is exceeding a first predetermined threshold for the CPU utilization metric, a second predetermined threshold for the memory utilization metric or a third predetermined threshold for the number of recurrent errors and recurrent restarts. The first predetermined threshold, the second predetermined threshold and/or the third predetermined threshold may be customizable by the one or more remote users and/or the one or more vendor applications.

The method may include selecting a second server from the server cluster. The second server may be selected because the second server is similar to the first server over a predetermined similarity threshold.

The method may include copying an entirety of the first server to a second server included in the server cluster. It should be appreciated that the copying may be executed simultaneously to one or more remote users and one or more remote vendor applications operating on the first server.

The method may include testing an operation of the second server to determine that a health and/or operability metric of the second server meets the second server over a predetermined health and/or operability threshold.

The method may include upon identifying that the health and/or operability metric meets the predetermined health and/or operability threshold, calling an API. The API may change the DNS pointer from a first address that identifies a location of the first server to a second address that identifies the location of the second server.

The method may include enabling the one or more remote users and the one or more remote applications to operate on the second server.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIGS. 1A, 1B, 1C and 1D show illustrative diagrams.

FIG. 1A shows users 110, server 106, vendor solutions 104 and proactive monitoring system 126. Users 110 may interface with server 106. Users 110 may be located in a remote location from server 106.

Server 106 may be named USEAST26, as shown at 116. USEAST26 may include multiple containers, as shown at 118. Each of the containers may execute one or more applications. Users 110 may perform work within each of the containers and/or the one or more applications.

Server 106 and/or containers 118 may interface with multiple vendor solutions, such as those shown within 104. The vendor solutions may include a database, shown at 120. The database may be external to server 106. The database may be located at a location external to an entity in which server 106 is located. Server 106 may interact with database 120 over a wired or wireless network, such as an internal network and/or the internet.

The vendor solutions may also include a simple storage services solution, shown at 122. Simple storage services solution 122 may be external to server 106. Simple storage services solution 122 may be located at a location external to an entity in which server 106 is located. Simple storage services solution 122 may be an object storage and may enable data to be tiered to a cloud provider. Tiering may enable a data center, or server, to move data that is less active to an archive storage location within the cloud storage. Tiering may also enable the data center or server to maintain control of the stored data. Server 106 may interact with simple storage services solution 122 over a wired or wireless network, such as an internal network and/or the internet.

The vendor solutions may also include a search application, shown at 124. Search application 124 may be external to server 106. Search application 124 may be located at a location external to an entity in which server 106 is located. Search application 124 may provide a distributed multitenant capable full-text search with a hypertext transfer protocol (HTTP) web interface and schema-free Java® script object notation (JSON) documents. Server 106 may interact with search application 124 over a wired or wireless network, such as an internal network and/or the internet.

At times, there may be failures within hardware components and/or software components of server 106. Therefore, it may be necessary to instantiate a backup server that mirrors the failed server. However, many times, instantiating a backup server is resource and time consuming. Additionally, there may be downtime upon failure of the original server until the backup server is mirrored and fully operable.

Therefore, proactive monitoring system 126 may be continuously and/or continually operating on server 106. Proactive monitoring system 126 may check for various efficiency metrics. These metrics may include central processing unit ("CPU") usage, a number of errors within a log file and any other suitable efficiency metrics. Proactive monitoring system 126 may initiate the backup server automatically upon determination that server 106 has reached the maximum for a predetermined threshold set for one or more of the efficiency metrics. As such, proactive monitoring system may initiate the failover process before a complete failure at server 106.

Figure 1B:
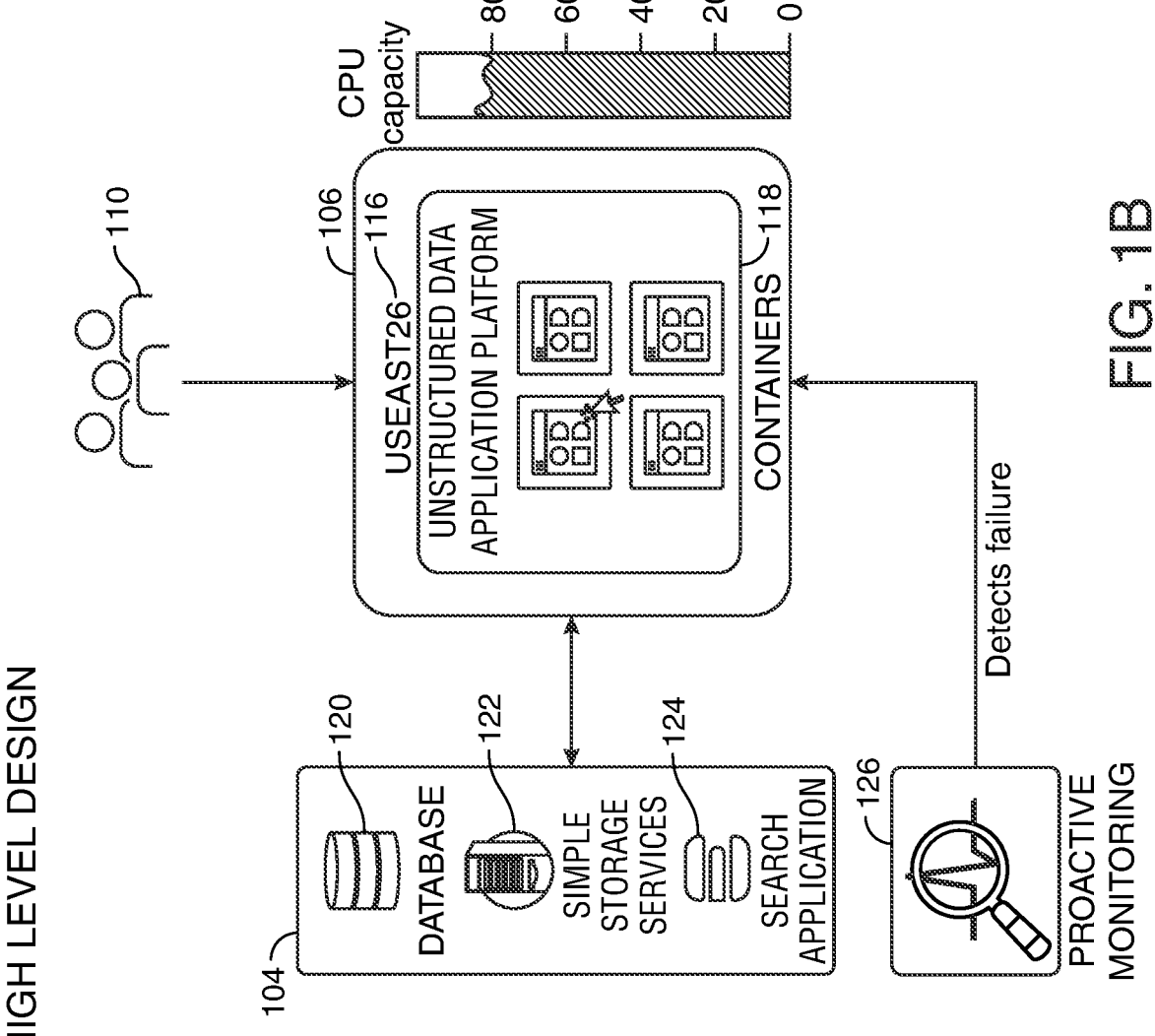

FIG. 1B shows that proactive monitoring system 126 detected a failure at USEAST106. The failure may be that a CPU capacity of server 106 may have exceeded a threshold capacity (for e.g., 70%) over a predetermined period of time.

Figure 1C:
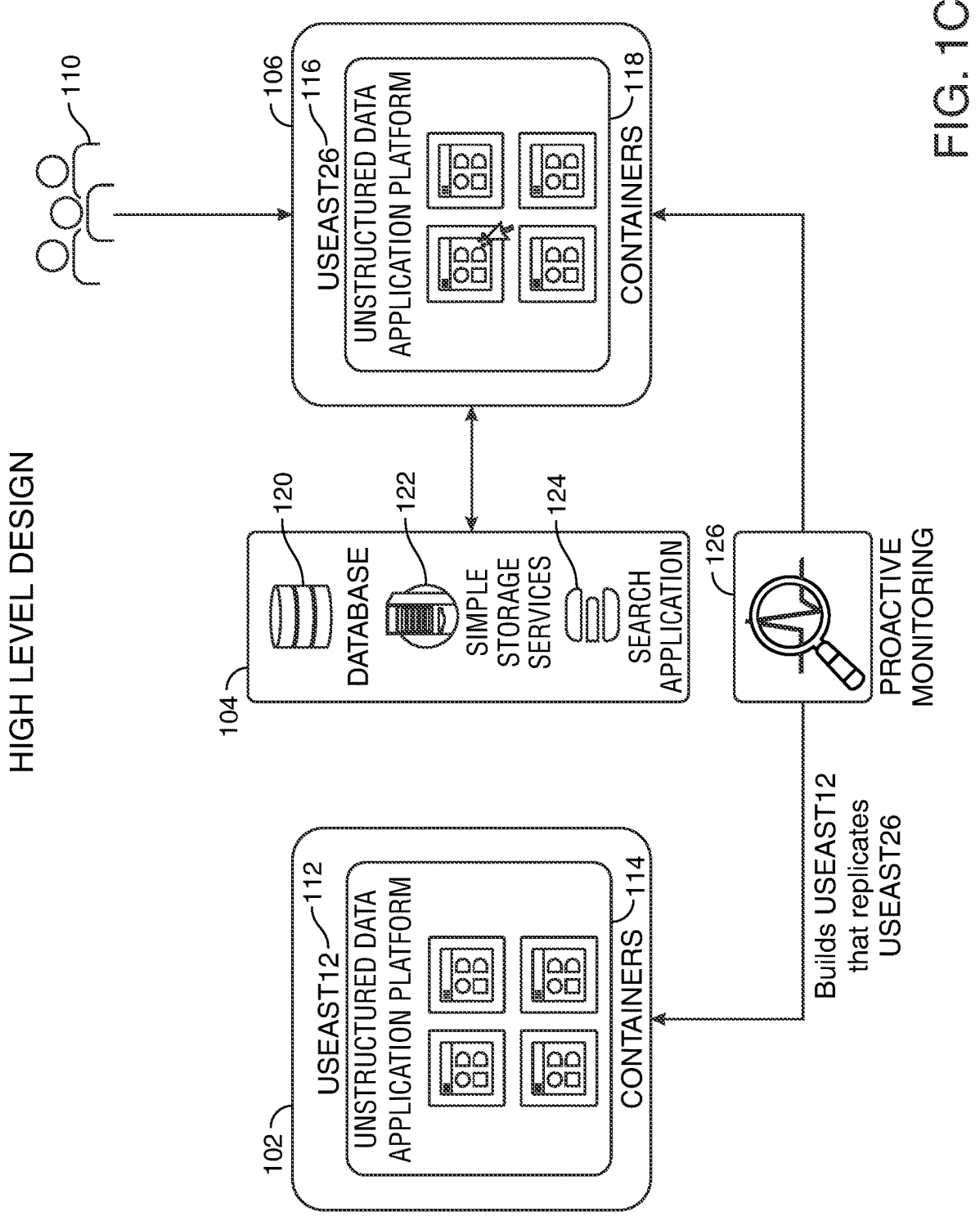

FIG. 1C shows initiation of a failover process. Proactive monitoring system 126 may initiate the failover process. In order to initiate the failover process, proactive monitoring system 126 may instantiate server 102 named USEAST12, shown at 112, and containers 114. Proactive monitoring system 126 may copy the contents of server 106 to server 102. It should be noted that remote users 110 and vendor solutions 104 may be able to access server 106 during the copying process.

Once the copying process from server 106 to server 102 is complete, the proactive monitoring system may initiate a switchover API. The switchover API may call the domain name service (DNS). The call may identify the original server, server 106, and the backup server, server 102. The call may instruct the DNS to switch a DNS pointer from server 106 to server 102. As such, remote users 110 may be switched over automatically from server 106 to server 102. Additionally, vendor solutions 104 may be switched over automatically from server 106 to server 102.

A DNS may be a list of uniform resource locators (URLs) and corresponding internet protocol (IP) addresses. Each URL points to a specific IP address. In the event that a server hosting a specific URL and IP address is not operative, a system may change, within the DNS, the IP address associated with the specific URL. As such, the URL can point to an operative server and the URL may be accessible.

Figure 1D:
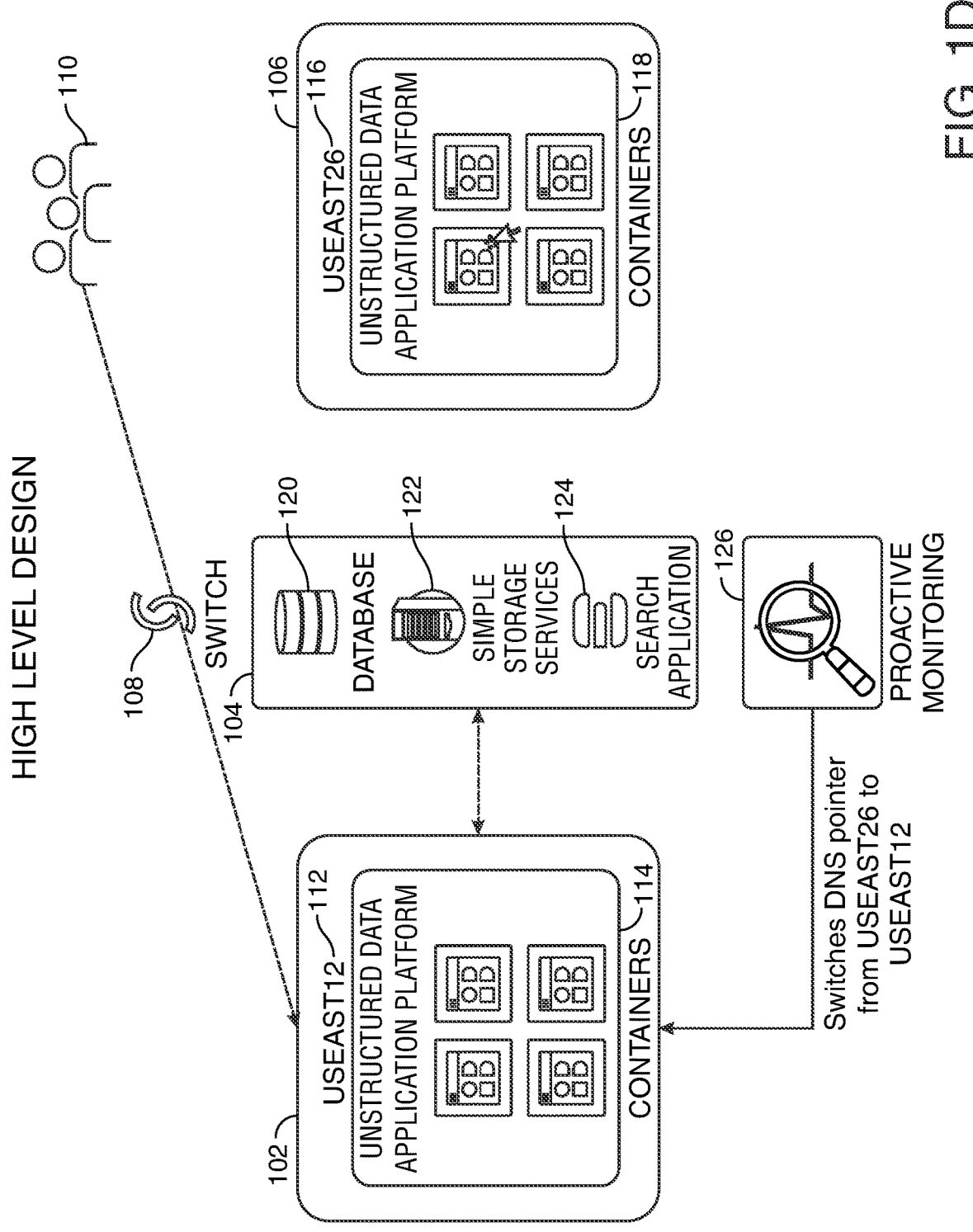

FIG. 1D shows a complete switchover from server 106 to server 102. It should be noted that remote users 110 may switch communication from server 106 to server 102, as shown at switched communication line 108.

Furthermore, once remote users 110 and vendor solutions 104 are accessing server 102, developers may be able to diagnose and repair server 106.

Figure 2:
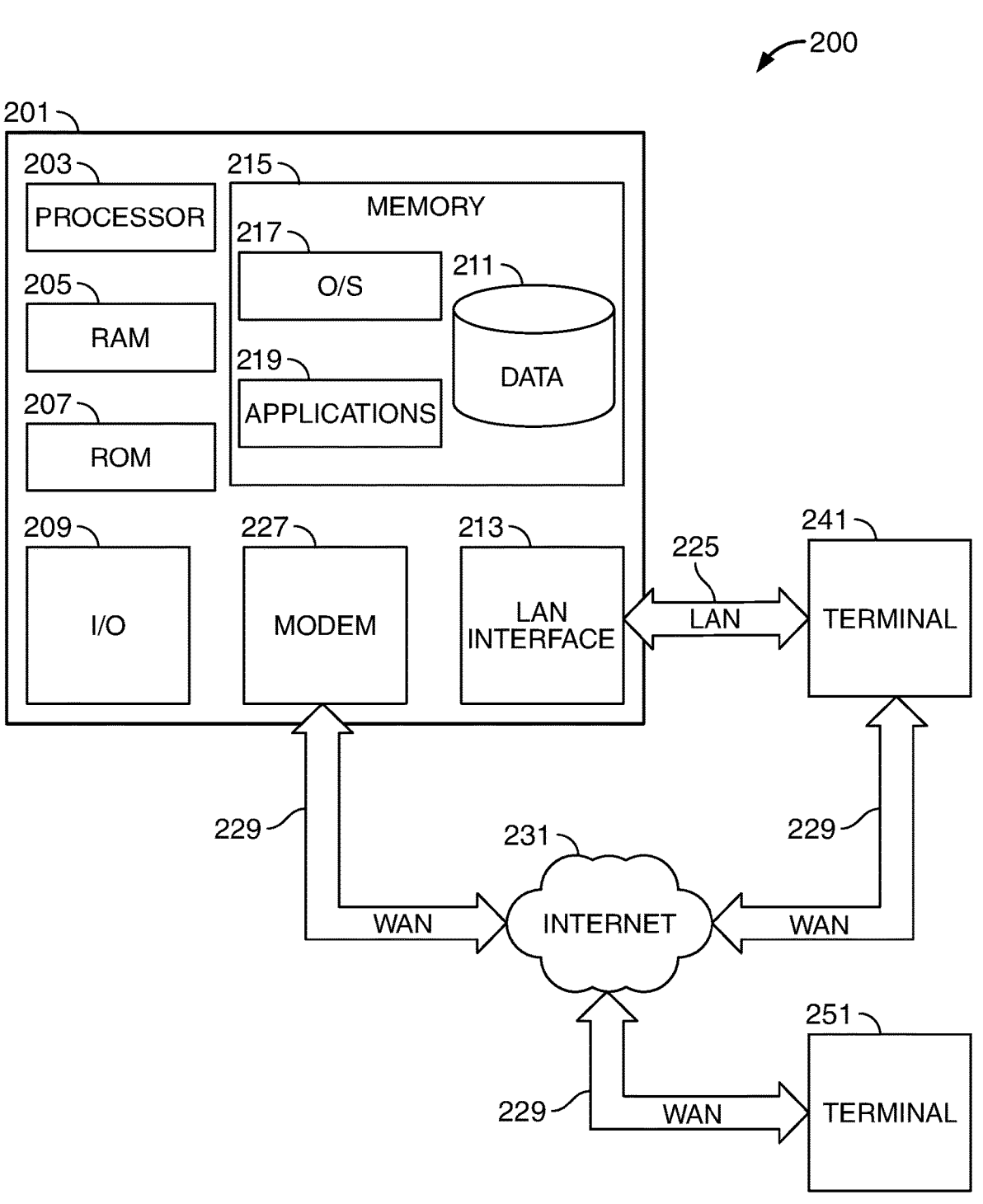
FIG. 2 shows another illustrative diagram in accordance with principles of the disclosure.

FIG. 2 shows an illustrative block diagram of system 200 that includes computer 201. Computer 201 may alternatively be referred to herein as a "server" or a "computing device." Computer 201 may be a desktop, laptop, tablet, smartphone, smart-watch, or any other suitable computing device.

Computer 201 may have a processor 203 for controlling the operation of the device and its associated components, and may include RAM 205, ROM 207, input/output ("I/O") module 209, and a memory 215. The processor 203 may also execute some or all software running on the computer—e.g., the operating system and/or voice recognition software. Other components commonly used for computers, such as EEPROM or Flash memory or any other suitable components, may also be part of the computer 201.

The memory 215 may be comprised of any suitable permanent storage technology—e.g., a hard drive. The memory 215 stores software including the operating system 217 any application(s) 219 along with any data included in database 211 needed for the operation of the system 200. Memory 215 may also store videos, text, and/or audio files. The videos, text, and/or audio files may also be stored in cache memory, or any other suitable memory. Alternatively, some or all of computer executable instructions may be embodied in hardware or firmware (not shown). The computer 201 may execute the instructions embodied by the software to perform various functions.

Input/output ("I/O") module may include connectivity to a microphone, keyboard, touch screen, mouse, and/or stylus through which a user of computer 201 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 200 may be connected to other systems via a local area network (LAN) interface 213.

System 200 may operate in a networked environment supporting connections to one or more remote computers, such as terminals 241 and 251. Terminals 241 and 251 may be personal computers or servers that include many or all of the elements described above relative to system 200. The network connections depicted in FIG. 2 include a local area network (LAN) 225 and a wide area network (WAN) 229 but may also include other networks. When used in a LAN networking environment, computer 201 is connected to LAN 225 through a LAN interface or adapter 213. When used in a WAN networking environment, computer 201 may include a modem 227 or other means for establishing communications over WAN 229, such as Internet 231.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server need not stream the data to the computer system. This may be beneficial for the computer system because the retrieval may be faster than data-streaming. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 219, which may be used by computer 201, may include computer executable instructions for invoking user functionality related to communication, such as e-mail, Short Message Service (SMS), and voice input and speech recognition applications. Application program(s) 219 (which may be alternatively referred to herein as "applications") may include computer executable instructions for searching, manipulating, and/or displaying graphs.

Computer 201 and/or terminals 241 and 251 may also be devices including various other components, such as a battery, speaker, antennas (not shown).

Terminal 251 and/or terminal 241 may be portable devices such as a laptop, cell phone, Blackberry™, tablet, smartphone, or any other suitable device for receiving, storing, transmitting and/or displaying relevant information.

Terminals 251 and/or terminal 241 may be other devices. These devices may be identical to system 200 or different. The differences may be related to hardware components and/or software components.

Any information described above in connection with database 211, and any other suitable information, may be stored in memory 215. One or more of applications 219 may include one or more algorithms that may be used to implement services relating to searching, manipulating, and/or displaying graphs.

The systems and methods of the disclosure may be operational with numerous other general purpose or special purpose computing systems, environments, or configurations. Examples of well-known computing systems, environments, and/or configurations that may be suitable for use with the disclosure include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The systems and methods of the disclosure may be described in the general context of computer-executable instructions, such as program modules, being executed by a computer. Generally, program modules include routines, programs, objects, components, data structures, etc. that perform particular tasks or implement particular abstract data types. The systems and methods may also be practiced in distributed computing environments where tasks are performed by remote processing devices that are linked through a communications network. In a distributed computing environment, program modules may be located in both local and remote computer storage media including memory storage devices.

Figure 3:
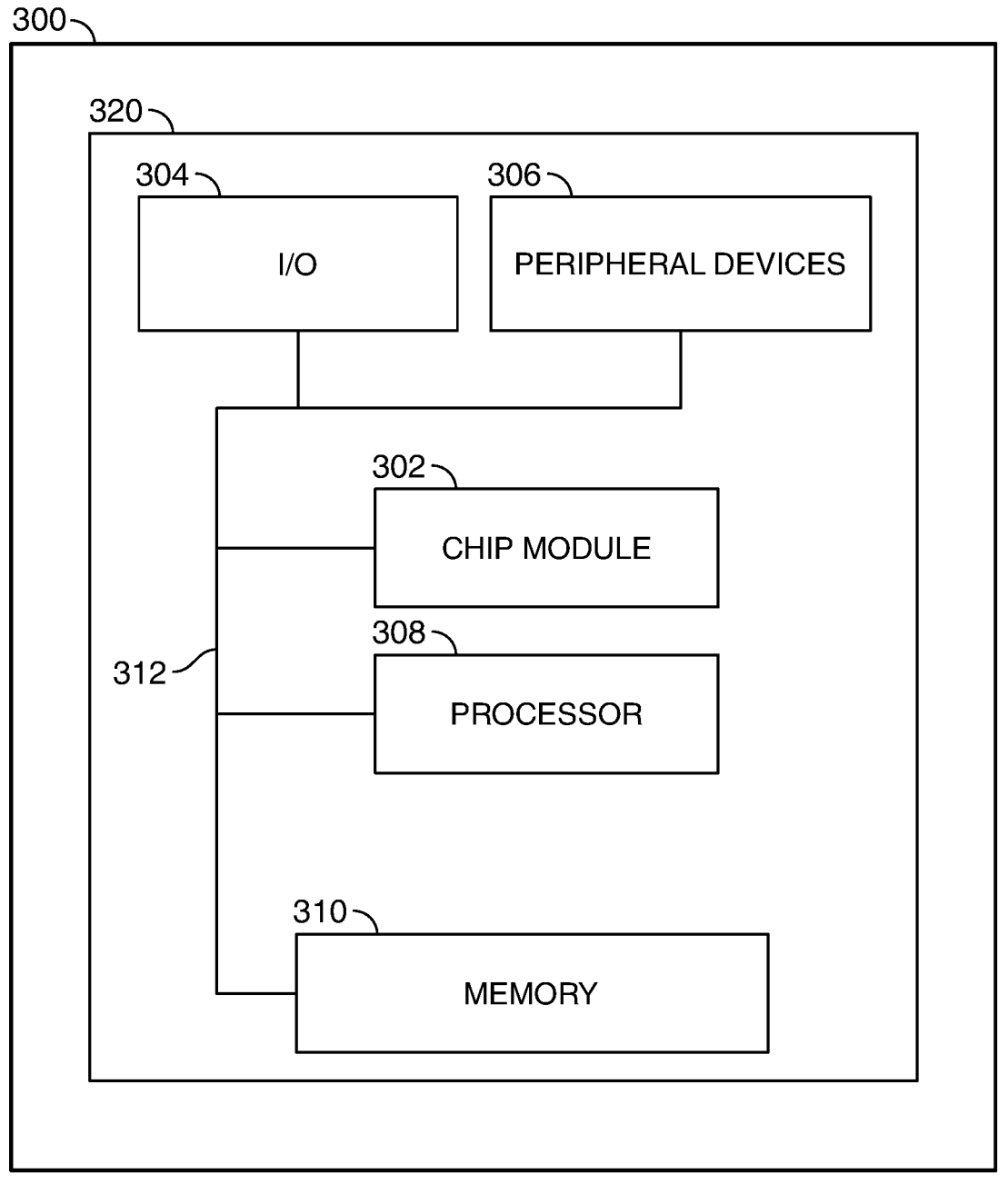
FIG. 3 shows yet another illustrative diagram in accordance with principles of the disclosure.

FIG. 3 shows illustrative apparatus 300 that may be configured in accordance with the principles of the disclosure. Apparatus 300 may be a computing machine. Apparatus 300 may include one or more features of the apparatus shown in FIG. 2. Apparatus 300 may include chip module 302, which may include one or more integrated circuits, and which may include logic configured to perform any other suitable logical operations.

Apparatus 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable media or devices; peripheral devices 306, which may include counter timers, real-time timers, power-on reset generators or any other suitable peripheral devices; logical processing device 308, which may compute data structural information and structural parameters of the data; and machine-readable memory 310.

Machine-readable memory 310 may be configured to store in machine-readable data structures: machine executable instructions (which may be alternatively referred to herein as "computer code"), applications, signals, and/or any other suitable information or data structures.

Components 302, 304, 306, 308 and 310 may be coupled together by a system bus or other interconnections 312 and may be present on one or more circuit boards such as 320. In some embodiments, the components may be integrated into a single chip. The chip may be silicon-based.

Thus, systems and methods for synchronization of container environments to maintain availability for a predetermined zone is provided. Persons skilled in the art will appreciate that the present invention can be practiced by other than the described embodiments, which are presented for purposes of illustration rather than of limitation. The present invention is limited only by the claims that follow.

What is claimed is:

1. A proactive monitoring-container switching system, the system comprising:
   a first server operating with a first hardware processor and a first hardware memory, said first server executing one or more first software containers, said first hardware memory comprising the one or more first software containers, said first server and/or the one or more first software containers being operated on by one or more remote users, the one or more remote users accessing the first server using a first address identified by a domain name service (DNS) pointer;
   a proactive monitoring subsystem, said proactive monitoring subsystem operable to:
      scan the first server for a plurality of efficiency metrics, the plurality of efficiency metrics comprising:
         a central processing unit (CPU) utilization metric of the first server;
         a memory utilization metric of the first server; and
         a number of recurrent errors and recurrent restarts in an error log associated with the first server;
      identify that the first server is exceeding one or more efficiency metrics included in the plurality of efficiency metrics;
      build a new server, said new server operating with a second hardware processor and a second hardware memory;
      copy an entirety of the first hardware memory to the second hardware memory, said copy being executed simultaneous to the one or more remote users operating on the first server, upon copying the entirety of the first hardware memory to the second hardware memory, the new server replicates the first server;
      test an operation of the new server, said new server comprising a copy of the entirety of the first hardware memory, to determine a health and operability metric of the new server;
      upon identifying that the health and operability metric of the new server, said new server comprising the copy of the entirety of the first hardware memory, is above a predetermined threshold, execute an application programming interface (API) that changes the DNS pointer from a first address that identifies a location of the first server to a second address that identifies a location of the new server; and
      automatically switches operation of the one or more remote users to the new server.

2. The system of claim 1, wherein the efficiency metrics included in the plurality of efficiency metrics are customizable by the one or more remote users.

3. The system of claim 1, wherein the first server interfaces with one or more vendor systems.

4. The system of claim 1, wherein, the first address and the second address are internet protocol addresses, and the DNS pointer links a uniform resource locator (URL) allocated for the first server to the first address and/or to the second address.

5. The system of claim 1, wherein a DNS that includes the DNS pointer is an application protocol used to resolve hostnames to internet protocol ("IP") addresses.

6. A proactive monitoring-container switching system, the system comprising:

a first server operating with a first hardware processor and a first hardware memory, said first server executing one or more software containers, said first hardware memory comprising the one or more software containers, said first server and/or the one or more software containers being operated on by one or more remote users, the one or more remote users accessing the first server using a first address identified by a domain name service (DNS) pointer;

a proactive monitoring subsystem, said proactive monitoring subsystem operable to:

scan the first server for a plurality of efficiency metrics, the plurality of efficiency metrics comprising:

a central processing unit (CPU) utilization metric of the first server;

a memory utilization metric of the first server; and a number of recurrent errors and recurrent restarts in an error log associated with the first server;

identify that the first server is exceeding one or more efficiency metrics included in the plurality of efficiency metrics;

build a new server, said new server operating with a second hardware processor and a second hardware memory;

move and copy the one or more software containers from the first server to the new server, said move and copy being executed simultaneous to the one or more remote users operating on the first server, upon move and copy the one or more software containers to the new server, the new server replicates the first server;

test an operation of the new server, said new server comprising a copy of the entirety of the first hardware memory, to determine a health and operability metric of the new server;

upon identifying that the health and operability metric of the new server, said new server comprising the copy of the entirety of the first hardware memory, is above a predetermined threshold, execute an application programming interface (API) that changes the DNS pointer from a first address that identifies a location of the first server to a second address that identifies a location of the new server; and automatically switches operation of the one or more remote users to the new server.

7. The system of claim 6, wherein the efficiency metrics within the plurality of efficiency metrics are customizable by the one or more remote users.

8. The system of claim 6, wherein the first server interfaces with one or more vendor systems.

9. The system of claim 6, wherein a DNS that includes the DNS pointer is an application protocol used to resolve hostnames to internet protocol ("IP") addresses.

10. The system of claim 6, wherein, the first address and the second address are internet protocol addresses, and the DNS pointer links a uniform resource locator (URL) allocated for the first server to the first address and/or to the second address.

11. A method for proactively monitoring a server cluster, said method comprising:

monitoring health of a server cluster, said server cluster comprising a plurality of servers, said monitoring comprising:

identifying a central processing unit ("CPU") utilization metric for each server included in the plurality of servers;

identifying a memory utilization metric for each server included in the plurality of servers;

identifying a number of recurrent errors and recurrent restarts in an error log included in each server included in the plurality of servers;

identifying that a first server, said first server comprising a first hardware processor and a first hardware memory, included in the server cluster, is exceeding:

a first predetermined threshold for the CPU utilization metric;

a second predetermined threshold for the memory utilization metric; or a third predetermined threshold for the number of recurrent errors and recurrent restarts;

building a new server within the server cluster, said new server operating with a second hardware processor and a second hardware memory;

copying an entirety of the first server to the new server included in the server cluster, said copying being executed simultaneously to one or more remote users and one or more remote vendor applications interacting with the first server, upon copying the entirety of the first server to the new server, the new server replicates the first server;

testing an operation on the new server, said new server comprising a copy of the entirety of the first hardware memory, to determine that a health and operability metric of the new server meets a predetermined health and operability threshold;

upon identifying that the health and operability metric of the new server, said new server comprising the copy of the entirety of the first hardware memory, meets the predetermined health and operability threshold, calling an application programming interface (API) to change a domain name service (DNS) pointer from a first address that identifies a location of the first server to a second address that identifies a location of the new server; and automatically switching operation of the one or more remote users and one or more remove vendor applications to the new server.

12. The method of claim 11, wherein the new server is similar to the first server over a predetermined similarity threshold.

13. The method of claim 11, wherein the first predetermined threshold, the second predetermined threshold and the third predetermined threshold are customizable by the one or more remote users.

14. The method of claim 11, wherein the first predetermined threshold, the second predetermined threshold and the third predetermined threshold are customizable by the one or more remote vendor applications.

15. The method of claim 11, wherein a domain name service that includes the DNS pointer is an application protocol used to resolve hostnames to internet protocol (IP) addresses.

16. The method of claim 15, wherein the first address and the second address are IP addresses.

17. The method of claim 15, wherein the DNS pointer links a uniform resource locator to the first address and/or the second address.

\*　\*　\*　\*　\*